United States Patent [19]

Nakamura

[11] 4,320,044
[45] Mar. 16, 1982

[54] SELF-EXTINGUISHING SILICONE RUBBER CONTAINING ALUMINUM HYDRATE

[75] Inventor: Akito Nakamura, Ichihara, Japan

[73] Assignee: Toray Silicone Company, Ltd., Tokyo, Japan

[21] Appl. No.: 197,389

[22] Filed: Oct. 16, 1980

[30] Foreign Application Priority Data

Dec. 25, 1979 [JP] Japan ................................ 54/168732

[51] Int. Cl.³ ............................................... C08K 3/22
[52] U.S. Cl. .................................. 524/413; 524/588; 524/398; 524/431; 524/91; 524/115; 524/190; 524/783; 524/781; 524/860; 524/863
[58] Field of Search ...................... 260/37 SB, 45.75 P

[56] References Cited

U.S. PATENT DOCUMENTS

| | | | |
|---|---|---|---|
| 2,541,642 | 2/1951 | Downs et al. .................. | 260/37 SB |
| 3,261,802 | 7/1966 | Bobear ........................... | 260/45.75 P |
| 3,514,424 | 5/1970 | Noble et al. ................... | 260/37 |
| 3,635,874 | 1/1972 | Laur et al. ..................... | 260/37 SB |
| 3,677,999 | 7/1972 | Denk et al. .................... | 260/37 SB |
| 3,862,082 | 1/1975 | Hatanaka et al. ............... | 260/37 SB |
| 3,965,065 | 6/1976 | Elliott ............................ | 260/37 SB |
| 4,110,300 | 8/1978 | Matsushita ...................... | 260/37 SB |
| 4,216,140 | 8/1980 | Simizu et al. ................... | 260/37 SB |
| 4,288,360 | 9/1981 | Bobear ........................... | 260/37 SB |

FOREIGN PATENT DOCUMENTS 50-97644 8/1975 Japan .
51-35501 10/1976 Japan .

*Primary Examiner*—V. P. Hoke
*Attorney, Agent, or Firm*—Roger H. Burrousch

[57] ABSTRACT

A mixture of polydiorganosiloxane, aluminum hydrate, and gamma-type iron sesquioxide or ferroferric oxide can be cured to provide a silicone rubber with improved self-extinguishing properties and heat stability.

21 Claims, No Drawings

SELF-EXTINGUISHING SILICONE RUBBER CONTAINING ALUMINUM HYDRATE

BACKGROUND OF THE INVENTION

1. Field of the Invention

This invention relates a silicone rubber having an improved self-extinguishing property.

2. Description of the Prior Art

Although silicone elastomers exhibit various excellent properties, they are inflammable and attempts have been made to make them self-extinguishable by various methods. For example, a platinum-containing material has been added to silicone rubber compounds as shown by U.S. Pat. No. 3,514,424, issued May 26, 1970, to Noble et al., a platinum compound and $(FeO)_x(Fe_2O_3)_y$ where the ratio of x/y is from 0.05/1 to 1.0/1 have been added to silicone rubber compounds as shown by Japanese Pat. No. Sho 51(1976)-35501, published Oct. 2, 1976, to Hatanaka et al. and a platinum compound and γ-type iron sesquioxide have been added to silicone rubber compounds as shown by Japanese Pat. No. Sho 53(1978)-44501. It is known from U.S. Pat. No. 3,965,065, issued June 22, 1976, to Elliott, to make silicone rubber containing aluminum hydrate and a combination of aluminum hydrate and chloroplatinic acid hexahydrate.

As pointed out in the above paragraph, platinum or a platinum compound is an indispensable additive for self-extinguishing silicone rubber compositions and imparts a relatively strong self-extinguishing capacity to silicone rubbers. However, platinum or platinum compounds are very expensive so that the cost of production of the silicone rubber is high. The presence of platinum or a platinum compound adversely affects the heat-stability property of silicone rubber. These are the drawbacks of the self-extinguishing silicone rubbers produced by the methods using platinum or platinum compounds.

SUMMARY OF THE INVENTION

Various methods were examined in order to eliminate the defects mentioned above, and it was discovered that a self-extinguishing silicone rubber composition which can be cured to a silicone rubber exhibiting an excellent self-extinguishing property and heat stability, could be produced at a low cost without using platinum or a platinum compound. A mixture of polydiorganosiloxane, aluminum hydrate, and gamma-type iron sesquioxide or ferroferric oxide can be cured to provide the stated properties.

DESCRIPTION OF THE INVENTION

This invention relates to a mixture comprising (A) 100 parts by weight of a polydiorganosiloxane represented by an average unit formula $$R_aSiO_{4-a/2}$$

wherein each R is selected from a monovalent hydrocarbon radical and a halogen-substituted monovalent hydrocarbon radical, and a has an average value of from 1.98 to 2.05, (B) 50 to 300 parts by weight of aluminum hydrate with an average particle size of $\leq 50$ μm, and (C) 0.1 to 30 parts by weight of an oxide selected from the group consisting of gamma-type iron sesquioxide, ferroferric oxide, and mixtures thereof, said oxide being in the form of an extremely fine powder, and said ferroferric oxide having a formula $(FeO)_x(Fe_2O_3)_y$ in which the ratio of x/y is from 0.05/1 to 1.0/1.

The polydiorganosiloxane used as component (A) is usually a straight-chain polydiorganosiloxane with the general formula $R_aSiO_{4-a/2}$ where each R represents a halogen-substituted or unsubstituted monovalent hydrocarbon radical selected from among methyl, vinyl, ethyl, propyl or aryl such as phenyl, or their halogenated derivatives and a has an average value of from 1.98 to 2.05. Examples of the units constituting the polydiorganosiloxane are dimethylsiloxane, methylphenylsiloxane, diphenylsiloxane, methylvinylsiloxane and phenylvinylsiloxane. The form of the polydiorganosiloxane is arbitrary and ranges from liquid to gum depending on the purpose. Homopolymers and copolymers, and a mixture of homopolymer(s) and copolymer(s) can be used. The degree of polymerization is 20 to 20,000. The preferred polydiorganosiloxane is a gum-like polymer with a degree of polymerization of $\leq 1000$. A small quantity of $RSiO_{1.5}$ can be contained in the above-mentioned structure. The ends of the molecular chains are arbitrary and include hydroxyl, alkoxyl, trimethylsiloxy, dimethylvinylsiloxy, methyldiphenylsiloxy and methylphenylvinylsiloxy groups.

Aluminum hydrate used as component (B) is indispensable to the self-extinguishing property of the silicone rubber mixture. The average particle size of the aluminum hydrate should be $\leq 50$ micrometers (μm) in order to impart surface smoothness and the self-extinguishing property to the cured silicone rubber. The quantity of aluminum hydrate to be added is from 50 to 300 parts by weight, preferably 100 to 200 parts by weight relative to 100 parts by weight of (A). When the quantity of the aluminum hydrate in the mixture is less than the value mentioned above, the silicone rubber does not exhibit a satisfactory self-extinguishing property. On the other hand, when the above-mentioned range of aluminum hydrate is exceeded, the tensile strength and the volume resistivity of the silicone rubber are impaired.

The general formulas of extremely fine powdery γ-type iron sesquioxide and fine powdery ferroferric oxide, component (C), are respectively, $γ-Fe_2O_3$ and $(FeO)_x(Fe_2O_3)_y$ where the ratio of x/y is from 0.05/1 to 1.0/1. Component (C) with component (B), is indispensable to the self-extinguishing property of the silicone rubber. A common iron oxide used in silicone rubber is $α-Fe_2O_3$, which is called "red oxide," however, a combination of $α-Fe_2O_3$ and aluminum hydrate does not exhibit as strong a self-extinguishing property as the combination of aluminum hydrate and the 2 types of iron oxide of component (C) of this invention. Gamma-type iron sesquioxide and ferroferric oxide can be used together.

The particle size of γ-type iron sesquioxide or ferroferric oxide as a component of the mixture is extremely fine such as $\leq 50$ μm. The quantity of this component to be added is 0.1 to 30 parts by weight, preferably 1 to 20 parts by weight relative to 100 parts by weight of component (A). When the quantity of (C) is less than 0.1 parts by weight, the resulting silicone rubber does not exhibit a sufficient self-extinguishing property. On the other hand, when the quantity of (C) exceeds 30 parts by weight, the silicone rubber composition does not exhibit workability and the elongation, tensile strength, volume resistivity and break down voltage of vulcanized silicone elastomer are impaired.

A conventional curing agent, an organic peroxide, can be added to and homogeneously mixed with the self-extinguishing silicone rubber mixture of this invention before heat vulcanizing. Examples of organic peroxide are benzoyl peroxide, 2,4-dichlorobenzoyl peroxide, 2,5-bis(t-butylperoxy)-2,5-dimethylhexane, dicumyl peroxide, monochlorobenzyl peroxide and t-butyl perbenzoate. The preferred quantity of organic peroxide to be added is 0.3 to 6 parts by weight relative to 100 parts by weight of component (A).

If necessary, in addition to the above-mentioned curing agent, an organosilicon compound such as diphenylsilanediol, an alkoxysilane, and low molecular weight hydroxyl endblocked polydimethylsiloxane can be added to the self-extinguishing silicone rubber mixture. Other self-extinguishing enhancing materials, such as finely powdered copper, calcium carbonate, calcium zirconate, zirconium silicate, manganese carbonate, titanium dioxide, cobalt organic acid salts, organophosphorus compounds, azo and triazole compounds, and essentially sulfur-free carbon black can be added. One or more reinforcing fillers and bulking fillers can be also added. Examples of the reinforcing fillers and bulking fillers are fumed silica, precipitated silica, fine quartz powder, diatomaceous earth, powdery zinc oxide, basic magnesium carbonate, active calcium carbonate, magnesium silicate, aluminum silicate, talc, mica powder, aluminum sulfate, calcium sulfate, barium sulfate, asbestos, glass fiber, organic reinforcing agents and organic fillers. In addition, traditional pigments, heat stability agents such as cerium oxide and ceric hydroxide, and antioxidants can be added.

The mixture is homogeneously kneaded using a roll or kneader mixer, vulcanized at 100°–450° C. under elevated or ambient pressure for several seconds to 1 hour, and then, if necessary, secondarily heat-aged at 200°–250° C. for 1 to 48 hours in order to obtain the silicone rubber product having an excellent self-extinguishing property.

This invention will be explained using demonstrative examples. "Part" in the examples means "part by weight."

The self-extinguishing property was measured by the following method. The heat-set silicone rubber was cut into test specimens, 130 mm-long, 13 mm-wide, 2 mm-thick. The test specimens were clamped vertically in an area free from air currents. The bottom of a test specimen was set on fire by nearly touching it with the upper part of the inner flame of the flame of a Bunsen burner (flame diameter, 11 mm; inner flame height, 20 mm and outer flame height, 40 mm) for 15 seconds. The Bunsen burner was then removed and the time (sec) required for the flame to die out was measured. This flame test was conducted twice for each of 5 test specimens. The average value (sec) was used as a measure of the self-extinguishing property.

EXAMPLE 1

A base mixture of 100 parts of a dimethylvinylsiloxy endblocked polydiorganosiloxane gum having a degree of polymerization of 5000; 99.5 mol% dimethylsiloxane units and 0.5 mol% methylvinylsiloxane units, 4 parts hydroxyl endblocked polydimethylsiloxane having a viscosity at 25° C. of 0.00004 m$^2$/g, 120 parts of aluminum hydrate having an average size of particle of 10 μm and 45 parts of precipitated silica having a specific surface area of 230 m$^2$/g was homogeneously kneaded and then heated at 150° C. for 2 hours. This base mixture in the amount of 100 parts was combined with 2 parts of $\gamma$-Fe$_2$O$_3$, 4 parts of FeO.Fe$_2$O$_3$ and 0.5 part of 2,5-dimethyl-2,5-di(t-butylperoxy)hexane (curing agent) as shown in Table 1. The resulting mixture was homogeneously kneaded using a two-roll mixer in order to obtain the mixture to be molded.

The mixture was vulcanized at 170° C. under an elevated pressure of 2.94 megapascals (MPa) for 10 minutes. The self-extinguishing property of the resulting 2 mm-thick silicone rubber sheet was examined by the method mentioned above.

For comparative examples, silicone rubber sheets were produced by the same method as described above with the exception that the curing agent, 0.4 part of 2 weight percent H$_2$PtCl$_6$ 6H$_2$O in isopropyl alcohol (IPA) solution and the curing agent, or 4 parts of $\alpha$-Fe$_2$O$_3$ and the curing agent were added to the base mixture. The self-extinguishing property was tested by the same method as described above. The results obtained are given in Table 1.

The tensile strength and elongation were determined on the silicone rubber of mixture 1 and comparative mixture 6 after vulcanization and then after heat aging for 30 hours at 250° C. The results obtained are shown in Table 1.

TABLE 1

|  | This invention | | | | Comparative example | | |
|---|---|---|---|---|---|---|---|
|  | 1 | 2 | 3 | 4 | 5 | 6 | 7 |
| Base mixture (parts) | 100 | 100 | 100 | 100 | 100 | 100 | 100 |
| $\gamma$-Fe$_2$O$_3$ (parts) | 2 | 4 | — | — | — | — | — |
| FeO . Fe$_2$O$_3$ (parts) | — | — | 2 | 4 | — | — | — |
| $\alpha$-Fe$_2$O$_3$ (parts) | — | — | — | — | 4 | — | — |
| H$_2$PtCl$_6$ . 6H$_2$O (parts) IPA solution | — | — | — | — | — | 0.4 | — |
| Curing agent (parts) | 0.5 | 0.5 | 0.5 | 0.5 | 0.5 | 0.5 | 0.5 |
| Self-extinguishing property | | | | | | | |
| First time (sec) | 0 | 0 | 1 | 0 | 8 | 6 | 13 |
| Second time (sec) | 10 | 12 | 8 | 5 | 25 | 24 | 60 |
| Physical Properties Initial | | | | | | | |
| Tensile Strength, MPa | 5.20 | — | — | — | — | 4.61 | — |
| Elongation, % | 225 | — | — | — | — | 185 | — |
| After heat aging at 250° C./30 hours | | | | | | | |
| Tensile Strength, MPa | 3.92 | — | — | — | — | 3.53 | — |
| (% retention) | (75.5) | — | — | — | — | (76.6) | — |
| Elongation, % | 100 | — | — | — | — | 50 | — |
| (% retention) | (44.4) | — | — | — | — | (27.0) | — |

EXAMPLE 2

A mixture of 100 parts of dimethylvinylsiloxy endblocked polydiorganosiloxane gum having a degree of polymerization of 7000; 99.8 mol % dimethylsiloxane units and 0.2 mol % methylvinylsiloxane units, 4 parts of hydroxyl endblocked polydimethylsiloxanes having a viscosity at 25° C. of 0.00004 m²/g, 180 parts of aluminum hydrate having an average particle size of 10 μm, and 30 parts of fumed silica having a specific surface area of 200 m²/g was homogeneously kneaded and then heated at 150° C. for 2 hours in order to obtain the base mixture.

This base mixture in the amount of 100 parts was combined with 2 parts of $\gamma$-$Fe_2O_3$, 2 parts of $FeO \cdot Fe_2O_3$, and 0.5 part of 2.5-dimethyl-2,5-di(t-butylperoxy)hexane (curing agent). The resulting mixture was homogeneously kneaded using a two-roll mixer in order to obtain the mixture to be molded. This mixture was vulcanized at an elevated temperature by the same method as in Example 1. The self-extinguishing property was tested by the method mentioned above.

For comparative examples, silicone rubber sheets were produced by the same method as mentioned above with the exception that the curing agent, or either 5 parts of $\gamma$-$Fe_2O_3$ and curing agent or 5 parts of $FeO \cdot Fe_2O_3$ and curing agent were added to the base mixture to which aluminum hydrate had not been added. The self-extinguishing property of these silicone rubber sheets which had been vulcanized by the method mentioned above were examined by the same method as described above.

The results obtained are given in Table 2.

TABLE 2

|  | This invention | | Comparative example | | |
|---|---|---|---|---|---|
| Base mixture | 1 | 2 | 3 | 4 | 5 |
| Gum (parts) | 100 | 100 | 100 | 100 | 100 |
| Hydroxyl endblocked polydimethylsiloxane (parts) | 4 | 4 | 4 | 4 | 4 |
| Aluminum hydrate (parts) | 180 | 180 | 180 | — | — |
| Fumed silica (parts) | 30 | 30 | 30 | 30 | 30 |
| Base mixture (parts) | 100 | 100 | 100 | 100 | 100 |
| $\gamma$-$Fe_2O_3$ (parts) | 2 | — | — | 5 | — |
| $FeO \cdot Fe_2O_3$ (parts) | — | 2 | — | — | 5 |
| Curing agent (parts) | 0.5 | 0.5 | 0.5 | 0.5 | 0.5 |
| Self-extinguishing property | | | | | |
| First time (sec) | 0 | 0 | 10 | * | * |
| Second time (sec) | 7 | 8 | 47 | — | — |

*Total destruction by fire

That which is claimed is:

1. A mixture comprising
   (A) 100 parts by weight of a polydiorganosiloxane represented by an average unit formula $$R_a SiO_{4-a}/2$$

wherein each R is selected from a monovalent hydrocarbon radical and a halogen-substituted monovalent hydrocarbon radical, and a has an average value of from 1.98 to 2.05,
   (B) 50 to 300 parts by weight of aluminum hydrate with an average particle size of $\leq 50$ μm, and
   (C) 0.1 to 30 parts by weight of an oxide selected from the group consisting of gamma-type iron sesquioxide, ferroferric oxide, and mixtures thereof, said oxide being in the form of an extremely fine powder, and said ferroferric oxide having a formula $(FeO)_x(Fe_2O_3)_y$ in which the ratio of x/y is from 0.05/1 to 1.0/1.

2. The mixture according to claim 1 further comprising an organic peroxide.

3. The mixture according to claim 1 further comprising at least one filler selected from the group consisting of a reinforcing filler and a bulking filler.

4. The mixture according to claim 3 further comprising an organic peroxide.

5. The mixture according to claim 1 further comprising a self-extinguishing enhancing material selected from the group consisting of finely powdered copper, calcium carbonate, calcium zirconate, zirconium silicate, manganese carbonate, titanium dioxide, cobalt organic acid salts, organophosphorus compounds, azo compounds, triazole compounds, and sulfur-free carbon black.

6. The mixture according to claim 5 further comprising an organic peroxide.

7. The mixture according to claim 6 further comprising at least one filler selected from the group consisting of a reinforcing filler and a bulking filler.

8. The mixture according to claim 2 in which the polydiorganosiloxane of (A) has a degree of polymerization of $\leq 1000$, the aluminum hydrate of (B) is present in an amount of 100 to 200 parts by weight, the oxide of (C) is present in an amount of from 1 to 20 parts by weight and the organic peroxide is present in an amount of from 0.3 to 6 parts by weight per 100 parts by weight of (A).

9. The mixture according to claim 1 in which the oxide of (C) is the gamma-type ferric oxide.

10. The mixture according to claim 8 in which the oxide of (C) is the gamma-type ferric oxide.

11. The mixture according to claim 1 in which the oxide of (C) is the ferroferric oxide.

12. The mixture according to claim 8 in which the oxide of (C) is the ferroferric oxide.

13. The mixture according to claim 8 further comprising at least one filler selected from the group consisting of a reinforcing filler and a bulking filler.

14. The mixture according to claim 13 in which there is present a reinforcing silica filler.

15. The mixture according to claim 14 further comprising an organosilicon compound selected from the group consisting of diphenylsilanediol, an alkoxysilane and low molecular weight hydroxyl endblocked polydimethylsiloxane.

16. A self-extinguishing silicone rubber obtained by heat vulcanizing the mixture of claim 2.

17. A self-extinguishing silicone rubber obtained by heat vulcanizing the mixture of claim 4.

18. A self-extinguishing silicone rubber obtained by heat vulcanizing the mixture of claim 6.

19. A self-extinguishing silicone rubber obtained by heat vulcanizing the mixture of claim 8.

20. A self-extinguishing silicone rubber obtained by heat vulcanizing the mixture of claim 13.

21. A self-extinguishing silicone rubber obtained by heat vulcanizing the mixture of claim 15.

* * * * *